United States Patent [19]

Gasparini et al.

[11] Patent Number: 4,499,892
[45] Date of Patent: Feb. 19, 1985

[54] ARRANGEMENT FOR SLAT SCREENS FOR SOLAR PROTECTION

[76] Inventors: Aldo Gasparini, Kungsportsavenyen 34, 411 36 Gothenburg; Nils-Erik Wimnell, Karl Gustavsgatan 59, 411 31 Gothenburg, both of Sweden

[21] Appl. No.: 485,130
[22] PCT Filed: Jun. 16, 1982
[86] PCT No.: PCT/SE82/00217
  § 371 Date: Feb. 22, 1983
  § 102(e) Date: Feb. 22, 1983
[87] PCT Pub. No.: WO83/00055
  PCT Pub. Date: Jan. 6, 1983

[30] Foreign Application Priority Data

Jun. 23, 1981 [DK] Denmark ............................ 2762/81

[51] Int. Cl.³ ................................................ F24J 3/02
[52] U.S. Cl. ...................................... 126/446; 126/450
[58] Field of Search ............... 126/448, 446, 447, 442, 126/438, 424, 425, 450

[56] References Cited

U.S. PATENT DOCUMENTS 4,222,368  9/1980  Rost ................................... 126/446

FOREIGN PATENT DOCUMENTS 942345  2/1949  France .............................. 126/442
2439976  2/1980  France .............................. 126/450

Primary Examiner—Samuel Scott
Assistant Examiner—G. Anderson

[57] ABSTRACT

Arrangement of slat screens for solar protection of the type having a number of slats (24;44) supported by girders (5) or the like, which slats are placed apart from each other and together form a solar screen. The girders (5) have slat holders (16) with projections (21) with surfaces which face away from each other. These surfaces slope in such a way relative to each other that they form together an entry portion (22) which on the inside is terminated by a groove (23) in each projection. The slats (24) are provided with a fixture (28,29) which has two opposing flanges (28) with outer hook-shaped projections (29) facing each other. The distance between the flanges is so chosen that the hook-shaped projections can be guided onto the widened out entry portion (22) so that during the bending of the flanges they are made to pass the widest part of the entry portion which is wider than the distance between the hook-shaped projections. After passing the entry portion the hook-shaped projections (29) snap down into the said grooves (23) by means of which the slat is held in positon Furthermore it is intended that the slats (44) should be provided with a longitudinal tubular section (64) arranged to be traversed by a flow of a fluid, by means of which the heat formed as result of the solar radiation against the slat can be removed in that the slat is connected to a piping system for the fluid.

5 Claims, 7 Drawing Figures

ARRANGEMENT FOR SLAT SCREENS FOR SOLAR PROTECTION

TECHNICAL FIELD

The present invention relates to an arrangement of slat screens for solar protection of the type provided with girders having slat holders which carry slats which are located at a distance from each other and which together form screens which intercept the sun's rays in a predetermined angular zone.

BACKGROUND

The method is known of designing screens which are intended to be mounted on facades and to prevent solar irradiation through the facade windows, at least for certain angles of incidence of the sun's rays. The known type of such sun screens to which the present invention relates is provided with a number of slats which are supported at intervals by girders and which together form an obstacle to the rays of the sun within the predetermined angular zone.

TECHNICAL PROBLEM

It is obviously desirable that such a sun screen, whilst satisfying the functional need imposed and complying with the necessary strength requirements, should be capable of being produced at an acceptable cost and in such a manner that to the largest possible extent standardised components can be employed for constructing the different types of sun screen required for different installation purposes.

THE SOLUTION

On the sun screen the supporting girders have projections on the slat holders, with surfaces which are directed away from each other and which slope in such a way in relation to each other that they form an entry portion, which opens out, and which is terminated inwards by means of grooves. Each of the slats includes a fixture provided with two oppositely-facing flanges with outer hook-projections. The distance between the flanges is so chosen that the hook-projections can be offered up to the entry portion and, during the bending of the flanges, be made to pass the widest part of the entry portion so that the hook-shaped projections will snap down into the grooves so that the slat is held in place by this means. Furthermore it is intended that the slats should be provided with a longitudinal tubular section designed to be traversed by a fluid, by means of which heat formed in the event of solar radiation against the slats can be dissipated because the slats are connected to a piping system for the fluid.

ADVANTAGES

By means of the invention a sun screen is provided which enables many types and sizes to be constructed using a few standard components and with the minimum possible amount of erection work. Furthermore the sun screen can be designed for a further purpose apart from solar screening, namely the interception of solar energy.

BRIEF DESCRIPTION OF DRAWINGS

The invention is shown on the appended drawings.

BEST MODE OF CARRYING OUT THE INVENTION

Figure 1:
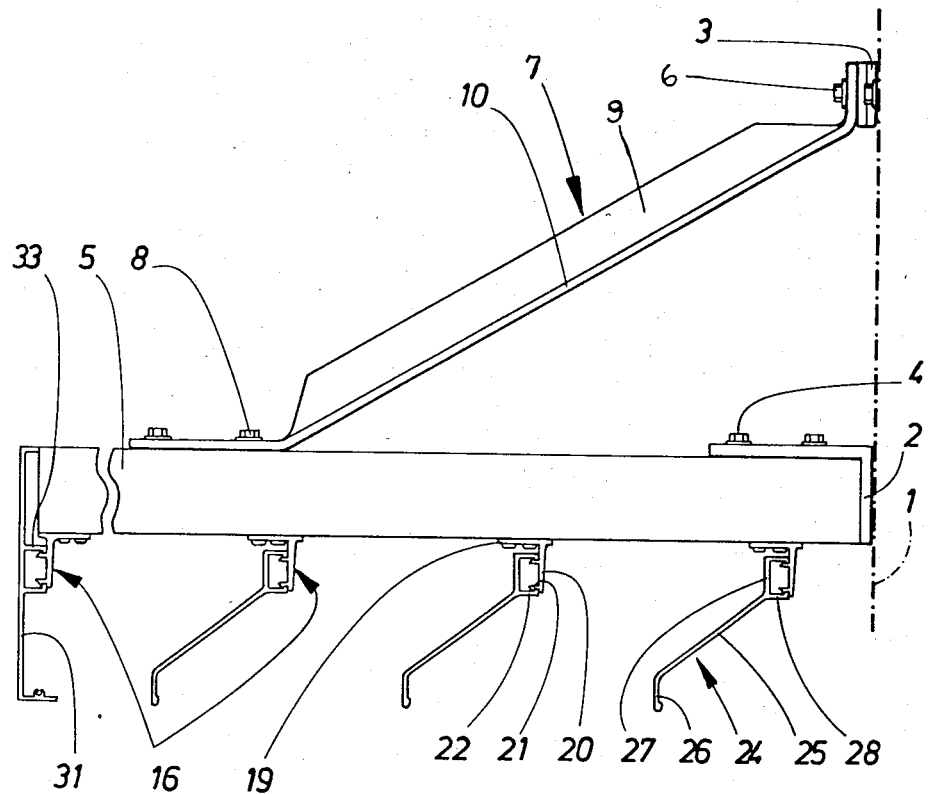
FIG. 1 shows in detail a solar screen in an initial embodiment in side view.

In FIG. 1 the dash-dotted lines illustrate a house facade 1. Two fixtures 2 and 3 are mounted on the latter. Fixture 2 supports by means of bolts 4 a girder 5. By means of a bolt 6 the fixture 3 supports a stay 7 which by means of bolts 8 holds the girder 5 in the horizontal position. The stay 7 consists of a T-section with a web 9 which is cut off above the flange 10 of the section at the ends so as to form tongues, through which extend holes for the bolts 6 and 8 and against the outsides of which the heads of the bolts can rest.

Figure 2:
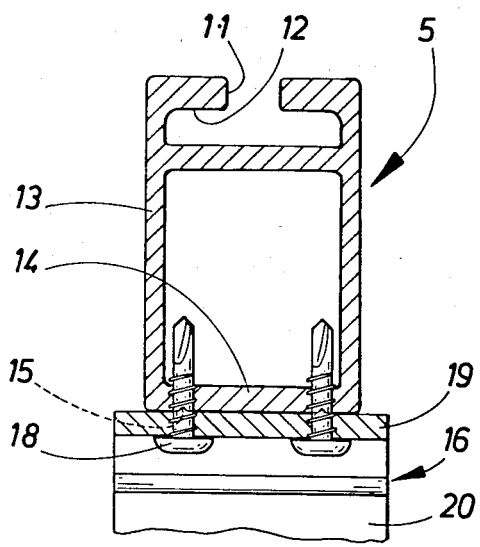
FIG. 2 shows a section appertaining to the solar screen.

The profile of the girder 5, as shown in FIG. 2, has a groove 11 which is open at the top inside flanges 12 which extend inwards together with a section 13 which is a closed cross section. This section 13 has a lower face 14 with two shallow grooves 15. The flanges 12 of groove 11 are employed for holding the bolts 8 which, by means of nuts grips the stay 7. The fixture 2 is also attached to the flanges 12. The lower face 14 of the lower portion 13 is employed for gripping the holder 16. This is done by means of bolts 18 which extend through the holders 16. These bolts are of the self-tapping and self-threading type and they are fixed by being introduced whilst being rotated into the drilling indentations formed by the grooves in the holder and groove 15.

In addition the holders 16 have the flange 19 which is held by means of the bolts 18 against flange 20 which is set at an angle to this flange. On this flange two projections 21 are provided having sloping surfaces 22 which face away from each other also a groove 23 located furthest in towards flange 20 so as to form hook-shaped end portions. The surfaces 22 slope inwards towards each other.

The two projections 21 are employed for holding a slat 24. The slat 24 has an extended portion 25 which comprises the actual solar protection portion together with an end portion 26 which is located obliquely in respect of the former portion. At its inner end the slat 24 has a portion 27 which is parallel to portion 26 with two flanges 28. The flanges 28 are terminated by inwardly facing hook portions 29 which fit into the grooves 23 (see FIG. 6). The flanges 28 are sufficiently long, with the material and the material thickness selected, to provide such springiness that the hooks can be introduced along the sloping surfaces 22 on the hooks 21 and into the respective grooves 23 into which the hook portions 29 snap downwards and effectively hold the slat firmly in position. Thus the slats can be attached by means of a simple snap-action operation. It is usually the slats which are subjected to damage, e.g. by dropping snow, and hence have to be replaced. This can easily be done by opening up the flanges 29 so that the slat can be removed from the hooks 21, followed by a new slat being snapped into position. Each slat is supported by at least two girders 5 and is kept by these in the horizontal position. Because the slats can slide in the snap fastening, thermal movements can easily be accommodated. It is appropriate here that each slat be locked into a girder.

As shown in FIG. 1, the outermost holder 16 faces the opposite way to the others. This is designed to carry a front fitting 31 which also has flanges 33 with hook portions designed to snap down into the groove 29 of the holder. It is best if all components (apart from the fixing components) are made from extruded light metal profiles, which can be provided with a complicated shape during manufacture.

Figure 3:
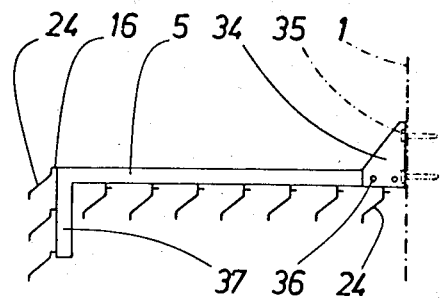
FIGS. 3, 4 and 5 illustrate three further types of solar screens which are made up of essentially the same components as that illustrated in FIG. 1.

FIG. 3 illustrates a somewhat modified embodiment. Instead of the fixtures 2 and 3 and the stay 7, here there is a fixture 34 in the form of a U-profile, through the web of which holes extend through which bolts 35 can extend into the facade wall 1 in order to hold the fixture 34. The girder 5 is in turn held against the fixture 34 by two bolts 36 which extend through the flanges of the U-shaped girder. In this case the girder 5 is terminated by a downward-facing portion 37, the side 14 of which (FIG. 2) faces outwards, i.e. away from the facade 1. This portion can be fixed by bolting or welding to the rest of the girder and has three holders 16 which support three slats 24. These slats thus comprise the front of the sun screen and, by adjustment of the length of portion 37, the front can be given the desired height. By making the front relatively high in this way the length of the sun screen outwards from the facade can be reduced.

Figure 4:
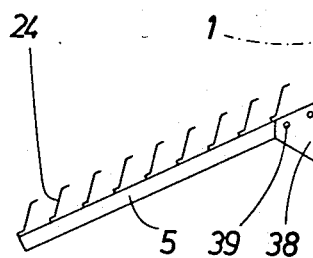

In some cases it can be advantageous to install the sun screen so that it slopes outward from the facade. This is shown in FIG. 4. Here the girder 5 is attached in a fixture 38 of the same type as fixture 34. However holes for the attachment bolts 39 for girder 5 are located along a sloping line so that the girder slopes downwards. The diagram also shows how the slats can be attached to the top side of the girder, which presupposes that this is turned with the groove 11 facing downward.

Figure 5:
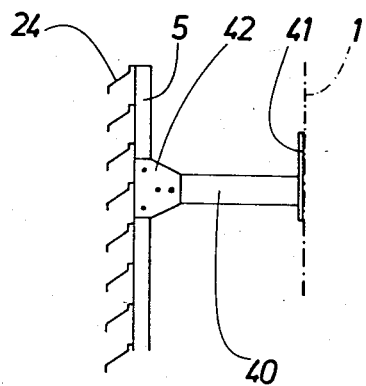

FIG. 5 illustrates a further embodiment where the entire sun screen is vertical. Thus the girder 5 extends vertically and is supported by an extra girder 40 with end fixtures 41 and 42 which join it with the facade 1 and the girder 5. The slats 24 are placed on the outside of girder 5 and are fastened as described previously.

The various forms described herein are selected dependent on the latitude (solar irradiation angle), the desired shading, window height and distance between dwellings, also the amount to which it is desired to have the sun screen projecting, together with other factors such as aesthetic factors. The description provided above shows how versatile the main components of the sun screen are in use.

Figure 6:
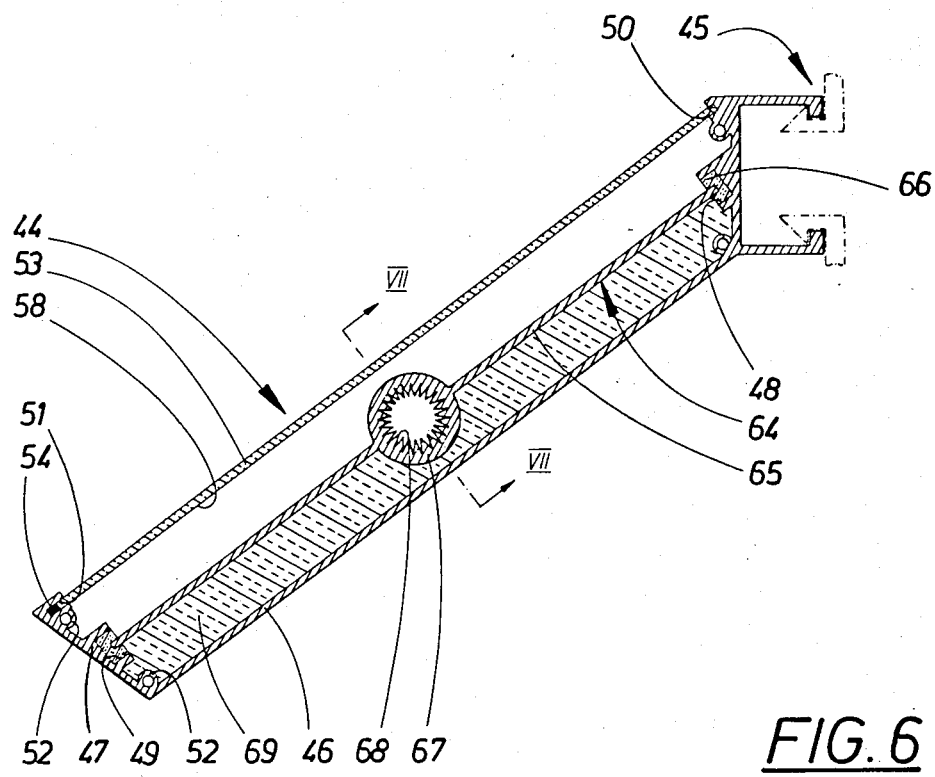
FIG. 6 illustrates a slat of a design different from the slats shown in FIG. 1, with a view of a section along the line VI—VI in FIG. 7, whilst

FIG. 6 illustrates how the sun screen can be adapted to suit a purpose other than its solar screening function. Naturally enough sun screens are erected on facades which are subjected to intense solar radiation and it is known that considerable heating up of the sun screens occurs during sunny periods. The object of the embodiment which will be described now is to utilise the solar heat so that in conjunction with the arrangement of the sun screens it is possible to obtain a solar interceptor arrangement at a very restricted extra cost.

FIG. 6 shows a slat 44, the basic shape of which corresponds essentially with slat 24. Thus slat 44 has a fixture 45 of the same type as that described previously, together with an extended portion 46. The extended portion 46 is terminated by an end portion 47 which is bent upwards to the same side as the fixture 45 so as to form a trough-like shape in which portion 46 comprises the base. The fixture 45 and end portion 47 have flanges which form grooves located side by side, also outer grooves 50 and 51 located at the free sides of the end portion 47 and fixture 45, also internal grooves 48 and 49 at a distance from the said sides. Furthermore there are four sections of screwed tube 52 at the outer "corners" which limit the trough shape formed by the fixture 45 and portions 46, 47. These screwed tubes 52 are extended strips with holes, in the ends of which self-tapping screws can be inserted as will be described later. As assumed previously, the slats are made from an extruded aluminium profile and screwed tube of this type can easily be inserted during manufacture.

As shown in FIG. 6 the grooves 50 and 51 are intended to support a glass or other transparent disc 53 which extends across the aperture of the said trough shape which has been formed. Here the groove 50 is provided with an outer flange across which the glass can be snapped into position during assembly by pressing the groove 51 against the resilient action of a rubber section 54. By this means a closed space is formed.

A metal unit 64 which is designed to utilise the solar heat is inserted in grooves 48, 49. The unit 64, which should preferably be made from extruded light metal, includes an extended plane portion 65 the ends of which are located in grooves to insulating strips 66, which in turn are supported by grooves 48,49 and which thus join element 64 to the slats. Furthermore unit 64 contains a portion 67 in the form of a tube, which in the embodiment illustrated in FIG. 6 is located in the centre of portion 65.

The invention is that the sun rays which pass through the glass 53 should impinge on the large surface of portion 65 and heat this up. This heat is transmitted by conduction to portion 67, the side of which facing the glass 53 is also obviously heated up. A heat-absorbing medium, preferably water, by means of which the solar heat can be utilised should flow in a cavity 68 in portion 67.

To ensure high absorption of the solar radiation the side of unit 64 which faces the glass 53 should be provided with an absorbent coating, e.g. dark oxidation. The absorption of solar heat can be regulated by the shaping of the heat absorbing portion, which can be given a shape differing from that of the tubular portion 67 which is illustrated here. Thus there can be several tubular portions which can easily be obtained by extrusion and it is alternatively possible to design the aperture for the heat absorbing medium in the form of an extended chamber which is located under a major portion of the side facing the glass 53. As shown in FIG. 6 the flow passage 68 can be provide with internal flanges which will increase the heat absorption surface for the medium.

To insulate the heated unit 64 to prevent cooling down on the side which is not subjected to solar radiation a layer of insulation 69 is laid against the side which faces away from glass 53 and this fills the space between unit 64 and portion 46 which forms a base in the trough-like shape. As mentioned the strips 66 have an insulating function and reduce heat conduction from unit 64 to the rest of the slats.

Figure 7:
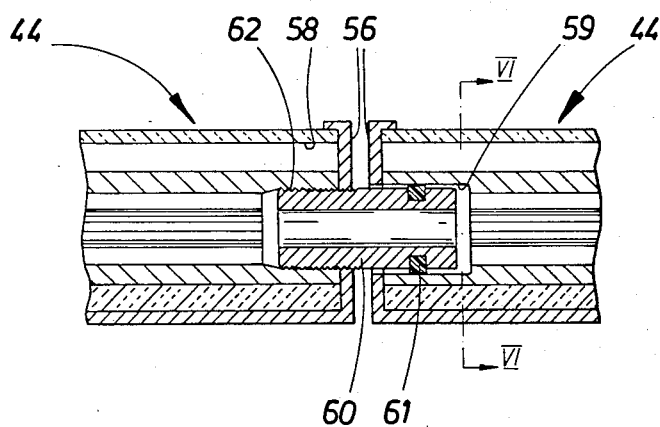
FIG. 7 shows an end view along the line VII—VII of two of the slats in accordance with FIG. 6.

FIG. 7 shows the ends of two abutting sections 44. These are provided with end plates 56 which at these ends seal the space 58 (FIG. 6) formed in the glass 53. The end plates are attached by means of bolts which are threaded into the screwed pipes 52. The diagram also shows that the tubular portion 67 is drilled so that the flanges 49 are removed at one end portion. In this drilled aperture one slat is provided with a thread 62 whilst the other slat has a smooth bore 59. The threaded end of a nipple 60 is inserted with a seal into the thread, and the other end is provided with a sealing ring 61 which provides a seal in the smooth bore 59. Thus these slats can move relative to each other, which would be impossible if the nipple were threaded into both slats. Alternatively the nipple can be made fully "floating", i.e. with sealing rings at both ends.

If the desire is to design a sun screen installation as solar interceptor the slats 44 are inserted instead of slats 24 to the desired extent, bearing in mind the temperature rise capacity. Consecutive slats are connected together with nipples 60 as shown in FIG. 7. At their far ends the outer slats are connected to piping in which a fluid, preferably water plus antifreeze, is supplied to or withdrawn from the slats in such a way that each slat is traversed in the tubular portion 67 by the fluid. When there is solar radiation the rays of the sun penetrate the glass 53 and impinge on the upward facing side of portion 65 which as already mentioned is provided with an absorbent coating. As a result the material in the slat is heated up. As a result of the flow of the fluid heat is extracted and thus heat conduction takes place to portion 67. By means of the flanges shown the material makes good contact with the fluid and heat transfer is good. By this means the temperature rise effect can be utilised. The short-wave rays of the sun can penetrate the glass 53 with only slight losses. When they impinge on the inner surface they are converted to heat and the long-wave thermal radiation which is subsequently reflected mainly towards the inside of glass 53. By this means the irradiation of energy is much greater than outward radiation via the glass 53. Radiation of heat from the rear side is restricted by the insulating coating 69. Heat transfer to the casing of the slat, the fixture 45 and portions 46, 47 is restricted by the insulating strip 66.

We claim:

1. An arrangement of slat screens for solar protection, comprising: a plurality of elongated slats mounted in spaced relationship to each other on a support and together forming a screen for intercepting the rays of the sun over a predetermined angular zone, each slat being an extruded light metal piece comprising a wide portion forming a plate, side edge portions extending upwardly from said wide portion on opposite sides thereof so as to form a trough, said edge portions having an outer ends thereof away from said wide portion first grooves, a transparent disc accommodated in said grooves so that a closed space is formed in the slat into which the rays of the sun may penetrate through the disc, said side edge portions having second grooves closer to said wide portion than said first grooves, thermally-insulating strips in said second grooves, a plate-shaped unit accommodated in said strips and of extruded light metal, and having a tubular portion for flow of fluid for dissipating the heat formed by solar radiation on the slat to a pipe system for the fluid, said unit dividing the space between the transparent disc and said wide portion into a first space located between the disc and the unit, and a second space located between the unit and said wide portion, and a plate-shaped insulating body in said second space, said support has slat holders with projections having surfaces which face away from each other and which slope in such a way in relation to each other that together they form an entry portion which opens out from ends of the projections, said entry portion terminating inwardly in a groove in each projection, each slat including a fixture which has two flanges facing each other and having outer hook-shaped projections facing each other, the distance between the flanges being such that the hook-shaped projections offer a widened out entry portion so that upon bending of the flanges they may pass the widest section of the entry portion, which is wider than the distance between the hook-shaped projections, so that after passing the entry portion the hook-shaped projections can snap downwards into said groove to hold the slat.

2. An arrangement according to claim 1, comprising a nipple arranged between tubular portions of adjacent consecutive slats and having ends extending into the respective tubular portions of said consecutive slats.

3. An arrangement according to claim 2, wherein said support has a cross sectional profile which is essentially unchanged over its length, said holders comprising short portions of a profile having said projections on an angular leg, and another angular leg for attachment to the support by screws for which notches are provided in the form of longitudinal grooves.

4. An arrangement according to claim 2 or 3, comprising bracket fittings for said support, said bracket fittings having a U-profile with a web to be attached to a structure and with flanges surrounding the support and fastened thereto.

5. An arrangement according to claim 2 or 3, comprising a stay for staying the support, the cross-section of said stay having the shape of a T-profile, with a flange removed at end portions thereof so as to form a flush fixture for a web of the T-profile.

* * * * *